United States Patent [19]

van den Broek

[11] Patent Number: 4,574,048

[45] Date of Patent: Mar. 4, 1986

[54] VACUUM FILTER SYSTEM FOR SWIMMING POOLS

[75] Inventor: William A. van den Broek, Doylestown, Pa.

[73] Assignee: KDI Sylvan Pools, Inc., Doylestown, Pa.

[21] Appl. No.: 583,872

[22] Filed: Feb. 27, 1984

Related U.S. Application Data

[63] Continuation-in-part of Ser. No. 453,233, Dec. 27, 1982, abandoned.

[51] Int. Cl.[4] .......................... B10D 35/00; E04H 3/16
[52] U.S. Cl. ..................................... 210/136; 210/169; 210/416.2
[58] Field of Search ..................... 210/169, 416.2, 232, 210/323.2, 418, 136, 117; 134/123, 111, 110

[56] References Cited

U.S. PATENT DOCUMENTS

| | | | |
|---|---|---|---|
| 2,790,461 | 4/1957 | Lightfoot et al. | 137/635 |
| 2,979,733 | 4/1961 | Claire et al. | 210/169 |
| 3,365,064 | 1/1968 | Horan, Jr. | 210/169 |
| 3,532,217 | 10/1970 | Richards | 210/169 |
| 3,859,214 | 1/1975 | Lang et al. | 210/169 |
| 4,127,485 | 11/1978 | Baker et al. | 210/169 |
| 4,187,179 | 2/1980 | Harms | 210/238 |
| 4,219,423 | 8/1980 | Smith, Jr. | 210/169 |
| 4,330,412 | 5/1982 | Frederick | 210/805 |

Primary Examiner—Marc L. Caroff
Assistant Examiner—Sharon T. Cohen
Attorney, Agent, or Firm—Z. T. Wobensmith, III

[57] ABSTRACT

A vacuum filter system for swimming pools, which includes a filter tank carrying a plurality of replaceable filter cartridges, the filter tank being in the suction line from the pool, which tank has an outlet connected to a pump which has a return line to the pool, with air being purged from the filter tank by the vacuum created in the filter tank when in operation.

4 Claims, 7 Drawing Figures

VACUUM FILTER SYSTEM FOR SWIMMING POOLS

CROSS REFERENCE TO RELATED APPLICATIONS

This application is a continuation-in-part of my prior application Ser. No. 453,233, filed Dec. 27, 1982, now abandoned entitled Vacuum Filter System for Swimming Pools.

BACKGROUND OF THE INVENTION

Field of the Invention

A vacuum filter system for swimming pools is provided with the filter tank located in the suction line between the pump and the pool.

DESCRIPTION OF THE PRIOR ART

Filters and systems for cleaning water from swimming pools are well known. Examples of representative systems are shown in the U.S. Pat. Nos. to Lightfoot, et al., U.S. Pat. No. 2,790,461; Horan, Jr., U.S. Pat. No. 3,365,064; Smith, Jr., U.S. Pat. No. 4,219,423; Richards, U.S. Pat. No. 3,532,217; Lang, U.S. Pat. No. 3,859,214; Baker, U.S. Pat. No. 4,127,485; Harms, U.S. Pat. No. 4,187,179; and, Frederick, U.S. Pat. No. 4,330,412. Many of these systems suffer from the danger of explosion due to the high pressures involved.

In addition, some of these systems, while nominally of the vacuum type, require the filter tank to be below the pool water level, with water flowing into the filter tank by gravity, and which are inconvenient for servicing.

The pumps used in swimming pool systems must be rugged and capable of moving large volumes of water continuously in and out of pools, with little maintenance and downtime of the system. Many owners of pools perform maintenance of the systems and have experienced problems with filter tank separation and/or explosion due to improper valve manipulation, improper filter tank assembly or clogged filters. While many of the systems in use, use vacuum pumps, the water to be filtered is usually put into the filter tank and pre-filters under high pressure.

The result with a clogged filter, or improper assembly or with the pool water return line valve closed and air in the filter tank, is a sudden high pressure condition in the filter tank exceeding the design limits and causing premature separation and/or explosion.

Pre-filters are small filters located in the water line before the main filter tank, and are supposed to remove large debris such as leaves, etc. prior to the water entering the main filter tank or pump. Pre-filters are readily susceptible to clogging, which causes pressure buildup and downtime or damage to the systems, and in addition, with the pump before the filter tank in the line from the pool, the pump can become clogged with debris causing premature failure.

The system of my invention protects the pump, does not require a pre-filter, the filter tank can be located above or below the pool water level, and possesses other advantages.

SUMMARY OF THE INVENTION

This invention relates to a vacuum filter system for swimming pools which use a single filter tank, and a single pump with the filter tank in the pool suction line between the pump and the pool.

The principal object of the invention is to provide a vacuum filter system which provides a high degree of safety to the user.

A further object of the invention is to provide a vacuum filter system that is self purging.

A further object of the invention is to provide a vacuum filter system which is simple and inexpensive to construct, but sturdy and reliable in operation.

A further object of the invention is to provide a vacuum filter system that is suitable for various sizes of pools, and which can be located above or below the pool water level.

A further object of the invention is to provide a vacuum filter system that is easy to maintain, and service by untrained personnel.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which.

Figure 1A:
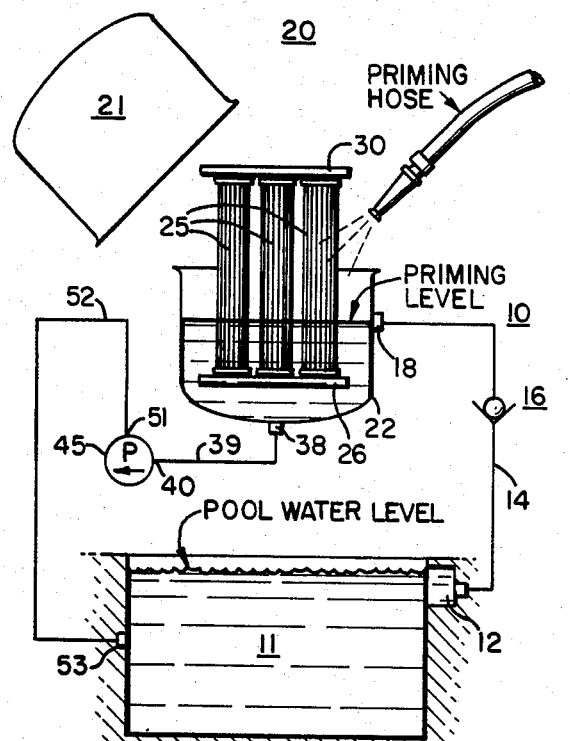
FIG. 1A is a diagrammatic view of the vacuum filter system of the invention, with the filter tank portion open illustrating the system being primed for use.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings and FIGS. 1A to 3, inclusive, a preferred embodiment of vacuum filter system 10 is illustrated in conjunction with a swimming pool 11 of conventional type.

The pool 11 as shown is provided with a skimmer drain 12 for removing surface water from the pool with a suction pipe line 14 connected thereto. The suction pipe line 14 is provided with a check valve 16 to control the flow of water therethrough. The suction line 14 is connected to the inlet 18 of a filter tank 20, of the two piece separable type, with a top half 21, a bottom half 22, and a sealing ring 23, all retained together by a clamp 24 in well known manner. The filter tank 20 contains a plurality of replaceable filter cartridges 25 of well known type carried by a lower retainer plate 26, on projections 27 spaced about the plate 26, the projections 27 being open and in communication with the interior of the filter cartridges 25, and the retainer plate 26 being engaged with the bottom half 22 of the tank 20.

The cartridges 25 are closed at their ends opposite to projections 27 and engaged with an upper retainer plate 30. The lower retainer plate 26 at the center thereof, is provided with a hollow vertically extending tube 33, which has a plurality of openings 34 therein. The tube 33 is engaged with a projection 27 at the center of retainer plate 26 and is engaged at its opposite end in upper retainer plate 30 and has a removable cap 35 engaged therewith with a screen 36 therein.

The tank bottom half 22 is provided with an outlet 38 which has a pipe 39 connected thereto and to the inlet 40 of a pump 45 of well known type such as Model No. of ½ HP as manufactured by A. O. SMITH CORP.

The filter tank 20 is supported by a frame 46 which includes upper and lower rings 47 connected by a plurality of legs 48, which legs 48 and lower ring 47 are supported on a concrete slab 50.

The pump 45 has an outlet 51 to which a return pipe line 52 is connected, to return filtered water to the pool 11 through return outlet 53.

Figure 4:
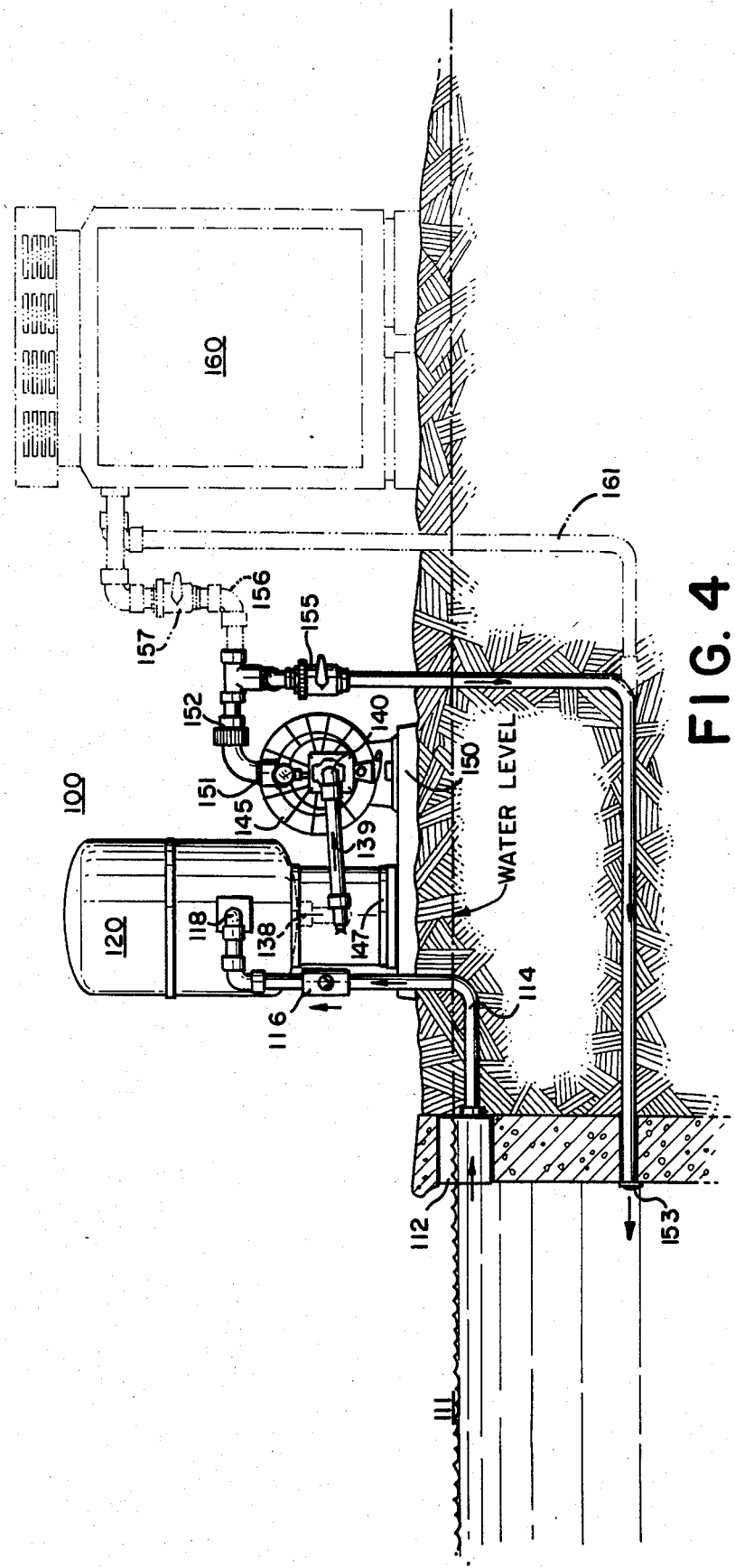
FIG. 4 is a side elevational view in partial section of another embodiment of the vacuum filter system of the invention.

Referring now more particularly to FIG. 4, another embodiment of vacuum filter system 100 is illustrated therein, which includes a pool 111 having a skimmer drain 112 therein, a water inlet suction pipe line 114 connected thereto, which pipe line has a check valve 116 therein, and is connected to inlet 118 of filter tank 120, which filter tank is the same as filter tank 20 previously described. The filter tank 120 has an outlet 138 with a pipe 139 connected thereto, and to the inlet 140 of a pump 145 of the same type as pump 45. The filter tank 120 is supported by a frame 146 which includes rings 147 and legs 148 supported on a concrete slab 150.

The pump 145 has an outlet 151 to which a return water pipe line 152 is connected to return filtered water to the pool 111 through return outlet 153. A shut off valve 155 is provided in return pipe line 152, and a water pipe line 156 is also connected to pipe line 152, with a shut off valve 157 therein which pipe line 153 is connected to one side of a pool water heater 160 of well known type.

The water heater 160 has an outlet pipe line 161 connected thereto, and to pipe 152 after valve 155, to return heated filtered water to the pool through return outlet 153.

The mode of operation will now be pointed out.

Figure 1B:
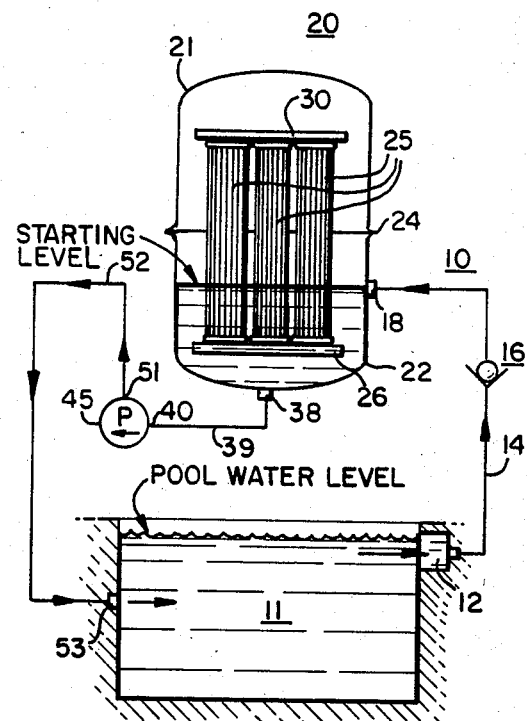
FIG. 1B is a view similar to FIG. 1A, but illustrating the filter tank portion of the system closed and at the starting level.
Figure 1C:
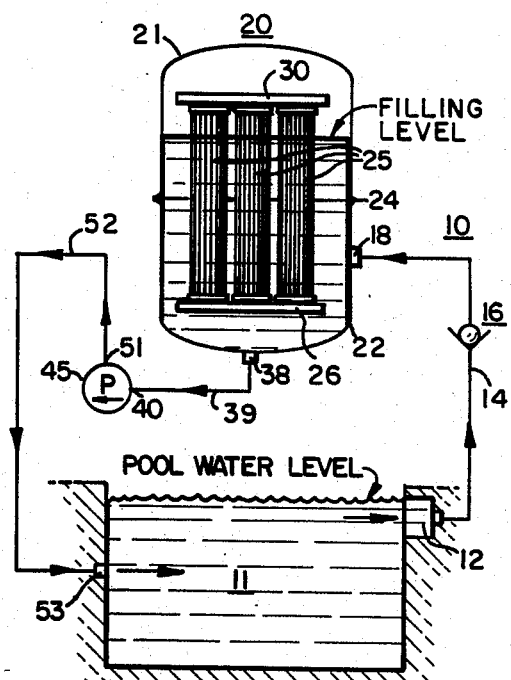
FIG. 1C is a view similar to FIG. 1B, but illustrating the system in operation and the filter tank filling up.
Figure 1D:
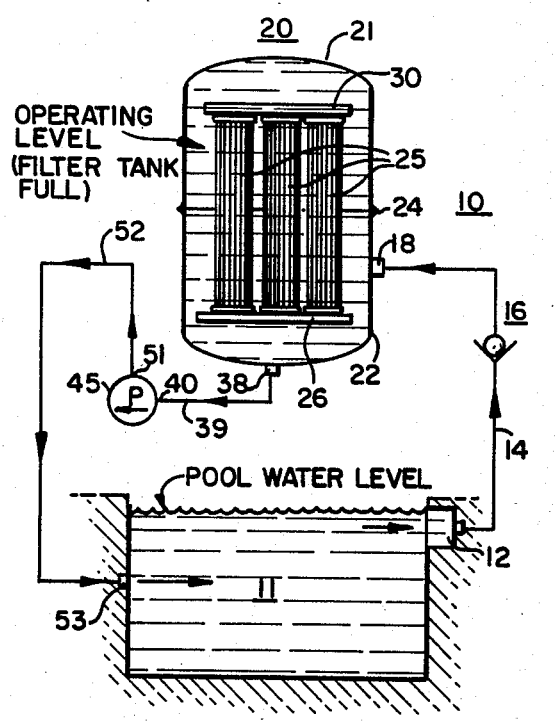
FIG. 1D is a view similar to FIG. 1C, but illustrating the system in operating condition with a full tank.
Figure 2:
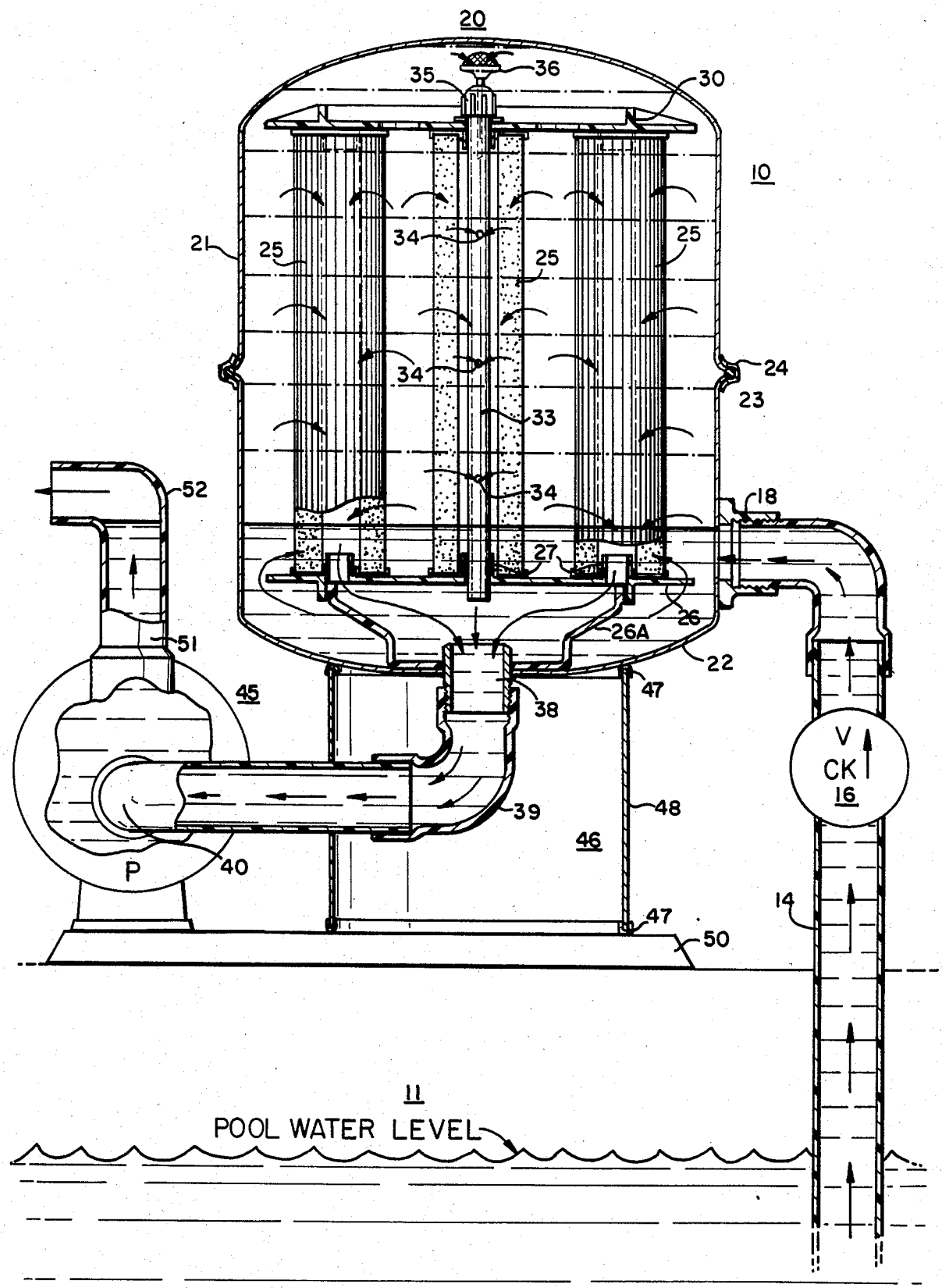
FIG. 2 is a diagrammatic view in partial section of the vacuum filter system of the invention illustrating internal water and air flow.
Figure 3:
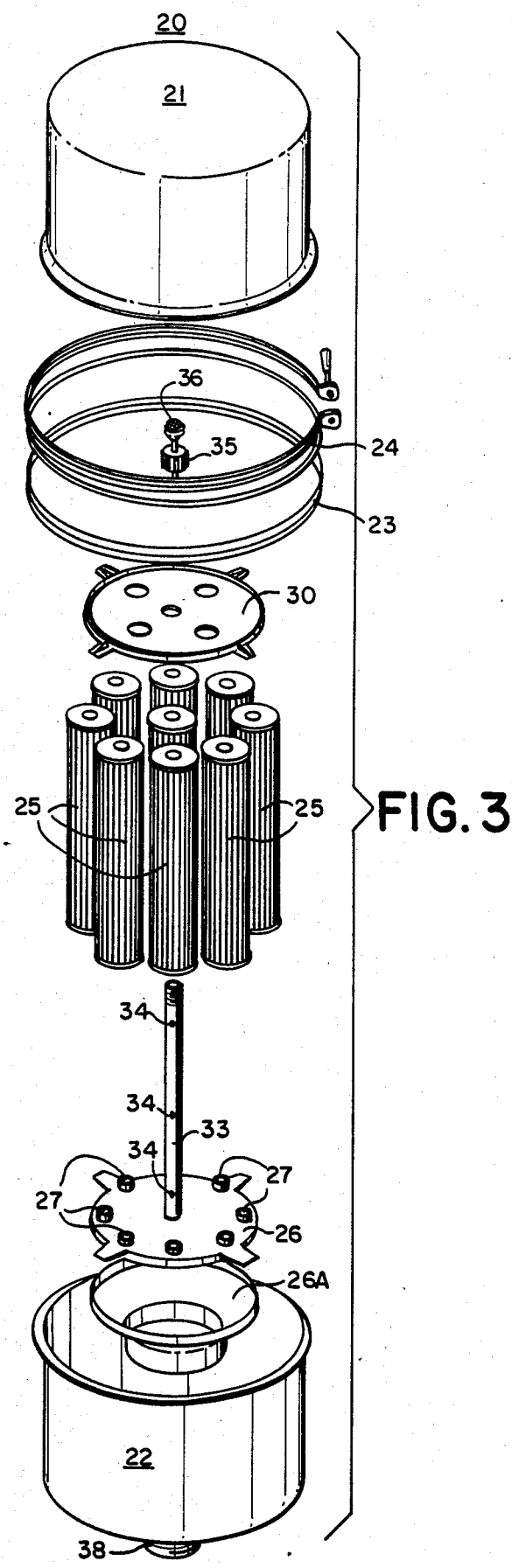
FIG. 3 is an exploded perspective view of the filter tank portion of the system of the invention.

Assuming that the filter tank 20 has been cleaned, and filter cartridges 25 have been installed as shown in FIG. 1A, water is added to the tank 20 to bring the level up to that shown as priming level and which can be at the height of inlet 18. The upper tank half 21 is placed on the bottom half 22, the sealing ring 23 and clamp 24 are applied as shown in FIG. 1B. The pump 45 is actuated and the water therein in tank 20 is drawn out and returned to the pool by return line 52 and outlet 53. The vacuum caused in the tank 20 by the withdrawal of water, causes a surge flow of water from the pool through suction pipe line 14, which forces the air in the tank to be pulled out through tube 33, outlet 27 and mixed with the water flowing out through outlet 38 with the water successively displacing the air as it surges into the tank 20 and rising as shown in FIG. 1C. The air continues to be displaced as water surges into the tank 20 due to the high vacuum until it reaches a water bound condition as shown in FIG. 1D.

If the pump 45 is shut off, water will not flow back into pool 11 through pipe line 14 since the check valve 16 prevents the flow. In addition, should there be a water leak or air in the system, the water level will not fall below that shown in FIG. 1B due to the check valve 16, and the pipe configuration with the result that the pump 45 remains in a flooded condition ready for use.

Should there be improper filter tank 20 assembly, or clogging, or an air leak in the pipe lines, there is no danger of explosion due to the vacuum feature of the system's operation.

The system as shown in FIG. 4, is operated as described above with the additional feature that the water can be heated prior to its return to the pool.

It will thus be seen that structure has been provided with which the objects of the invention are attained.

I claim:

1. A vacuum filter system for filtering water in swimming pools which comprises
   at least one suction pipe line connection to a swimming pool to remove water for filtering from said swimming pool,
   a closed vacuum filter tank for filtering water having an inlet and an outlet,
   said suction pipe line connected to said inlet of said filter tank,
   said filter tank is of separable two piece construction, including an upper half and a lower half,
   clamp means for retaining said tank halves in assembled condition,
   said bottom tank half has a lower retainer plate engaged with and supported therein,
   said lower retainer plate has a plurality of hollow projections spaced therearound,
   a plurality of filter cartridges carried on said projections and extending vertically upwardly,
   an upper retainer plate engaged with said filter cartridges,
   a hollow tube carried on a central projection of said lower plate and engaged with said upper retainer plate,
   said tube having means defining a plurality of openings,
   a removable cap engaged with said tube and retaining said cartridges between said plates,
   a vacuum pump having an inlet pipe line connected to said filter tank outlet and a return connection,
   said inlet of said vacuum pump in communication with said outlet of said filter tank said vacuum pump having means for controlling the operation of said vacuum in said tank, so that water from said pool flows thereinto, displacing any air therein, until said tank is in a flooded condition,
   the air in said tank is pulled downwardly through said tube and below said lower retainer plate,
   the water in said tank is forced through said filter cartridges and mixed with said air, which enters the inlet of said vacuum pump, and
   at least one return pipe line connected to said pump return connection for returning filtered water to said pool.

2. A vacuum filter system as defined in claim 1 in which
   wherein the controlling means is a check valve provided in said suction pipe line.

3. A vacuum filter system as defined in claim 1 in which a shut off valve is placed in said pump return pipe line, a second pipe line is connected to said pump return pipe line before said shut off valve, a water heater is provided connected to said second pipe line, and a water return pipe line is connected to said water heater and to said return pipe line after said valve to return heated filtered water to said pool.

4. A vacuum filter system as defined in claim 6 in which said clamp means includes a sealing ring and a clamp for retaining said filter tank halves in assembled condition.

* * * * *